(12) United States Patent
Komiya et al.

(10) Patent No.: US 7,942,169 B2
(45) Date of Patent: May 17, 2011

(54) FOLDING TYPE CABLE PROTECTION AND GUIDE DEVICE

(75) Inventors: Shoichiro Komiya, Osaka (JP); Takayuki Matsuda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 967 days.

(21) Appl. No.: 11/781,113

(22) Filed: Jul. 20, 2007

(65) Prior Publication Data

US 2008/0066821 A1 Mar. 20, 2008

(30) Foreign Application Priority Data

Sep. 20, 2006 (JP) ................ 2006-254637

(51) Int. Cl.
*F16L 11/00* (2006.01)
(52) U.S. Cl. ......... 138/110; 138/119; 138/120; 59/78.1; 248/49; 248/51
(58) Field of Classification Search ................ 138/110, 138/119, 120, 128; 174/19, 68.1, 68.2, 68.3, 174/95, 97, 101; 59/78.1; 248/49, 51
See application file for complete search history.

(56) References Cited

U.S. PATENT DOCUMENTS

| 1,984,232 | A |   | 12/1934 | Peremi et al. |   |
|---|---|---|---|---|---|
| 3,473,769 | A |   | 10/1969 | James |   |
| 3,517,702 | A |   | 6/1970 | Mueller et al. |   |
| 3,786,171 | A | * | 1/1974 | Shira | 174/504 |
| 4,391,303 | A | * | 7/1983 | Holgersson | 138/166 |
| 4,463,046 | A | * | 7/1984 | Hutchison et al. | 428/156 |
| 4,647,715 | A |   | 3/1987 | Butler |   |
| 5,411,443 | A |   | 5/1995 | Meier et al. |   |
| 5,905,231 | A |   | 5/1999 | Houte et al. |   |
| 6,032,702 | A |   | 3/2000 | Bearden |   |
| 6,161,373 | A |   | 12/2000 | Heidrich et al. |   |
| 6,333,461 | B1 | * | 12/2001 | Marcou et al. | 174/68.3 |
| 6,459,037 | B2 |   | 10/2002 | Muller et al. |   |
| 6,708,480 | B1 |   | 3/2004 | Wehler |   |
| 6,966,527 | B2 |   | 11/2005 | Komiya |   |
| 7,049,508 | B2 | * | 5/2006 | Bushey et al. | 174/481 |
| 7,418,812 | B2 |   | 9/2008 | Ikeda et al. |   |
| 7,696,434 | B2 | * | 4/2010 | Ruddick | 174/68.3 |
| 2001/0025715 | A1 |   | 10/2001 | Muller et al. |   |

FOREIGN PATENT DOCUMENTS

| JP | 10-028310 | 1/1998 |
|---|---|---|
| JP | 10-047441 | 2/1998 |
| JP | 2001003997 | 1/2001 |
| JP | 2001221292 | 8/2001 |
| JP | 2001514725 | 9/2001 |
| JP | 2003533955 | 11/2003 |
| JP | 2004159406 | 3/2004 |
| JP | 2007508797 | 4/2007 |
| JP | 2007-108498 | 3/2009 |
| WO | PCT/EP 98/01214 | 6/1998 |
| WO | 1998040645 | 9/1998 |
| WO | 2005040659 | 6/2005 |

\* cited by examiner

*Primary Examiner* — James F Hook
(74) *Attorney, Agent, or Firm* — Woodland, Krost and Rust

(57) ABSTRACT

A folding type cable protection and guide device is provided in which a cable is accommodated into a cable accommodating space. The cable accomodating space can be easily adapted to accommodate the cable, even if the cable is a long body. The assembly load is decreased. Further, the use of many different sized metal molds is not required. The form stability of the cable accommodating space is sufficiently ensured during both linear movement and flexion movement, so that smooth linear movement and flexion movement can be attained. The rectangularly shaped cable accommodating space is formed by folding a pair of right and left folded sections 110, 110 extending in a longitudinal direction of the extruded synthetic resin tape 100 along the longitudinal direction of the tape.

7 Claims, 6 Drawing Sheets

FOLDING TYPE CABLE PROTECTION AND GUIDE DEVICE

This application claims priority to Japanese Pat. Appln. 2006-254637 filed Sep. 20, 2006.

The present invention relates to a cable protection and guide device. More specifically, it relates to a cable protection and guide device suitable for accommodating a comparatively light weight and small diameter cable which supplies a movable member with energy such as electric power or compressed air. Examples include: a semiconductor device, a pharmacy developing testing device, a vehicle door opening/closing device, a vehicle slide seat, and a vehicle motor sunroof. The cable protection and guide device safely and reliably guides and protects a cable (cables) even during movement of the portable member.

BACKGROUND TECHNOLOGY

Conventional cable protection and guide devices for cables/hoses are known in the prior art. In the conventional device, the upper edges and lower edges of pairs of oppositely spaced and similarly shaped link plates are respectively connected with flaps and bottom plates as connecting members. See, for example, Patent Reference 1 which is Japanese Laid-Open Patent Publication No. Hei 10-47441.

Further, a foldable protection element is also known in the prior art. The foldable protection element is composed of segments. Each segment is integration-molded or cast in one piece into a substantially flat structure from a synthetic substance and connected to each other by flexible bridges. See, for example, Patent Reference 2 which is Japanese Patent Indication No. 2001-514725.

PROBLEMS TO BE SOLVED BY THE INVENTION

In the protection and guide chain described in Japanese Laid-Open Patent Publication No. Hei 10-47441, the link plates, flaps, and bottom plates (which are their connecting members) must be reliably connected in multiple positions in the longitudinal direction of the cable. Problems arise from the complicated structure and its attendant assembly.

Further, when a foldable protection element described in Japanese Patent Indication No. 2001-514725 is injection-molded or cast in one piece and the element has a large width and length, there is a problem with producing a large metal mold.

A long protection element cannot be easily manufactured because a long mold is required. Temperature control of large metal molds is difficult. Costs increase with mold size. Further, it is difficult and time consuming to assemble the various segments to each other one by one.

Accordingly, the object of the present invention is to provide a folding assembly type cable protection and guide device, wherein the cable to be accommodated into the cable accommodating space is long. The cable protection and guide device can be easily manufactured by extrusion molding without changing the size of a metal mold. As a result, the assembly is simplified and integrity of the cable accommodating space is ensured during both linear and flexion movement.

SUMMARY OF THE INVENTION

Means for Solving the Problems

The invention attains the above-mentioned object through the provision of a folding type cable protection and guide device which is characterized by a cable accommodated into a rectangularly shaped cable accommodating space. The rectangularly shaped cable accommodating space is formed from a synthetic resin tape. The synthetic resin tape is extruded in a longitudinal direction. The cable accomodating space is folded through a pair of right and left folded sections extending in a longitudinal direction of an extruded synthetic resin tape. Linear movement and flexional movement are repeated along the longitudinal direction of the tape. The synthetic resin tape has outer circumferential wall formation sections which adjacently engage with each other in a longitudinal direction of the tape during linear movement and separate from each other to open at predetermined pitches in the longitudinal direction of the tape during flexional movement.

A pair of right and left side wall formation sections are disposed adjacent to folding sections. The folding sections are located on both sides of the outer circumferential wall formation section. The side wall formation sections are adjacently engaged with each other in the longitudinal direction of the tape during linear movement and separate from each other to open at predetermined pitches in the longitudinal direction of the tape during flexional movement.

The pair of right and left inner circumferential wall formation sections are respectively disposed perpendicular to the pair of right and left side wall formation sections.

During assembly, the pair of right and left inner circumferential wall formation sections disposed opposite from the outer circumferential wall formation section on the other side of the cable accomodating space are arranged in an overlapped manner along the longitudinal direction of the tape.

In addition to the example mentioned above, the folding type cable protection and guide device attains the above-mentioned object with a splitting slit. The splitting slit separates the outer circumferential wall formation sections and the pair of right and left side wall formation sections of the synthetic resin tape from each other at a predetermined pitch in a longitudinal direction of the tape. During flexional movement, the splitting slit is opened. The splitting slit crosses the folding section at a predetermined pitch. At the same time, the splitting slit separates the folding section, while leaving the pair of right and left inner circumferential wall formation sections intact.

Further, in addition to the example described above, the folding assembly type cable protection and guide device attains the above-mentioned object with a concave portion/convex portion engagement mechanism. The concave portion/convex engagement mechanism restricts a lateral shift at the time of linear movement.

The concave portion/convex engagement mechanism is located at the front and back positions in the splitting slit of the outer circumferential wall formation section. The concave portion/convex engagement mechanism is formed by punching.

Further, the folding type cable or the like protection and guide device attains the above-mentioned object by employing a folding section that includes an arc-shaped groove or V-shaped groove, which faces the cable accomodating spaces and runs along the longitudinal direction of the tape.

Further, in addition to the example listed above, the folding type cable protection and guide device attains the above-mentioned object by employing an outer circumferential wall formation section, a side wall formation sections, and an inner circumferential wall formation section molded of polypropylene. The folded section is molded of polyester or thermoplastic olefin elastomer.

Effects of the Invention

A folding type cable protection and guide device is formed wherein a cable is accommodated into a rectangularly shaped cable accommodating space. The rectangularly shaped cable accommodating space is formed from a synthetic resin tape. The synthetic resin tape is extruded in a longitudinal direction. The cable accomodating space is shaped by folding a pair of right and left folded sections which are part of the synthetic resin tape. The accomodating space extends in a longitudinal direction of an extruded synthetic resin tape. Both linear movement and flexional movement can repeated for extended durations of time with satisfactory performance of the device. In order to protect and guide a long cable, the synthetic resin tape can be cut as an integrated object according to the length of the cable. As a result, the cable accommodating space can be easily adapted to the optimum length to accomodate the cable. Thus, assembly is simplified. Connecting a large number of link plates of a conventional protection and guide chain to each other for a specific cable length is not necessary.

According to an example of the invention, the synthetic resin film tape is continuously extruded irrespective of the length of a cable to be accommodated. A long device can be easily manufactured without the need for a metal mold. Extrusion molding does not require various sizes of metal molds as is the case of injection molding or casting in order to accommodate specific lengths of a cable.

According to an example of the invention, since the synthetic resin tape can be easily folded through a folding section, a rectangularly shaped cable accommodating space can be uniformly and reliably assembled in a desired length.

The synthetic resin tape has outer circumferential wall formation sections and a pair of right and left side wall formation sections. The outer circumferential wall formation sections adjacently engage each other in a longitudinal direction of the tape during linear movement. The outer circumferential wall formation sections separate from each other to open at predetermined pitches in the longitudinal direction of the tape during flexional movement. Smooth flexional movement can be attained with the outer circumferential wall formation sections and the pair of right and left side wall formation sections being respectively separated from each other with a flexional movement radius.

The synthetic resin tape has outer circumferential wall formation sections, a pair of right and left side wall formation sections, and a pair of right and left inner circumferential wall formation sections. The pair of right and left inner circumferential wall sections are integral with the pair of right and left side wall formation sections.

When assembled, the pair of right and left inner circumferential wall sections are on one side of the cable accomodating space opposite the outer circumferential wall formation sections. The pair of right and left inner circumferential wall sections come together in an overlapped manner along the longitudinal direction of the tape during assembly. During both linear movement and flexional movement, the synthetic resin tape naturally maintains a rectangular section-shaped cable accommodating space once folded through folding sections. As a result, both the linear movement and the flexional movement can be smoothly repeated for a long period of time.

The pair of right and left inner circumferential wall formation sections and side wall formation sections are extruded together in a vertical L-shape. During assembly, the folding operation load is reduced requiring only folding of the folding sections. During both linear and flexional movement, dimensional stability of the rectangular section-shaped cable accommodating space can be maintained over long periods of time utilizing the durable aspects of this structure which does not require extensive assembly.

Further, a splitting slit separates the outer circumferential wall formation sections and the pair of right and left side wall formation sections of the synthetic resin tape from each other at a predetermined pitch in a longitudinal direction of the tape during flexional movement. The spliting slit crosses the folding section at a predetermined pitch and at the same time splits the folding section while leaving the pair of right and left inner circumferential wall formation sections intact. During flexional movement, the splitting slit opens. The splitting slit is formed by punching.

A punching shape for punching can be appropriately selected to change the splitting slit. Thus, the flexion pitch for forming a cable accommodating space can be changed. While the splitting slit is formed by punching, the pair of right and left inner circumferential wall formation sections which are integrally formed remain intact. This pair of right and left inner circumferential wall formation sections form a stable path for flexion movement enabling the cable to travel in a flexed path in a stable manner.

A concave portion/convex portion engagement mechanism restricts a lateral shift at the time of linear movement. This concave portion/convex portion engagement mechanism is formed by punching the front and back positions of the outer circumferential wall formation section. The punching form can be appropriately selected. The concave portion/convex portion engagement form can be changed to a variety of forms. The concave portion/convex portion engagement mechanism restricts a lateral shift of the adjacent outer circumferential wall formation sections so that snaking movement is avoided and smooth linear movement can be attained.

Further, the folding section includes an arc-shaped groove or a V-shaped groove, which opens along a longitudinal direction of the tape. As a result, during folding a rectangularly shaped cable accommodating space is more easily formed. Folding sections have reduced resilience which allow for reliable folding of the side walls to form the cable accommodating space of the final device.

Further, the outer circumferential wall formation sections, the side wall formation sections, and the inner circumferential wall formation sections are molded of polypropylene. Using this material, both extrusion and punching are easily performed. As a result, the cable accommodating space can be easily manufactured. The folded section is molded of polyester or thermoplastic olefin elastomer. The folding section is made of a material which exhibits greater flexibility than the outer circumferential wall formation sections, the side wall formation sections, and the inner circumferential sections. Use of a flexible material in the folding sections, reduces the resilience generated at the time of folding. The force necessary for folding during assembly can be reduced allowing the device to formed more easily.

A cable protection and guidance device which accommodates a long cable can be easily manufactured by extrusion molding. This simplifies the manufacturing process. Further, stability of the cable accommodating space is ensured at times of linear movement and flexion movement. Stability is achieved when the cable is accommodated into a rectangularly shaped cable accommodating space surrounded by a synthetic resin film tape. The rectangular shaped cable accomodating space is formed by folding a pair of right and left folded sections extending longitudinally. The cable accommodating space can withstand both repeated linear movement and flexing movement over long periods of time. The folding type cable protection and guide device may be used where other devices in addition to hoses and cables are protected and guided.

The synthetic resin tape includes folding sections. The cable guide and protection device is formed by folding these sections which are integrally formed as part of the synthetic resin tape. In particular, the side wall formation sections are vertically folded with respect to the outer circumferential wall formation sections. In the case where the inside of the cable accommodating space becomes arc-shaped, resilience between the outer circumferential wall formation section and the side wall formation section after folding can be preferably reduced.

A concave portion/convex portion restricts a lateral shift of the adjacent outer circumferential wall formation sections. A splitting slit is used to restrict a lateral shift of the adjacent outer circumferential wall formation sections during linear movement so that snaking movement can be avoided. Other forms of the concave portion/convex portion engagement mechanism may be used, which include, for example, a form comprising: a triangular tongue piece-shaped convex portion and a V-shaped concave portion, or a trapezoid tongue piece-shaped convex portion and an inverse trapezoid-shaped concave portion. The triangular piece-shaped convex portion engages with a V-shaped concave portion and the trapezoid tongue piece-shaped convex portion engages with the inverse trapezoid-shaped concave portion.

Further, polypropylene is the preferred material of the outer circumferential wall formation sections, the side wall formation sections, and the inner circumferential wall formation sections in the folding type cable protection and guide device of the present invention. The folding section is preferably formed of a polyester, thermoplastic olefin elastomer, or a material less rigid than polypropylene (or other material used in the the outer circumferential wall formation sections, the side wall formation sections, and the inner circumferential wall formation sections). The rigidity of a rectangular section-shaped cable accommodating space can be increased while suppressing the resilience of a flexed section during flexional movement. This is accomplished by forming the outer circumferential wall formation section and the side wall formation section of the same material, while the inner circumferential wall formation section is formed of a material slightly softer than the outer circumferential and side wall formation sections.

Multi-color molding which can use various kinds of synthetic resins during extrusion is used to apply the most suitable material to the different sections of the device. The folding sections, the outer circumferential wall formation sections, the side wall formation sections, and the inner circumferential sections are formed of their specifically preferred material during the extrusion of the synthetic resin tape in the present invention.

BRIEF DESCRIPTION OF THE DRAWINGS

EXAMPLE

Figure 1:
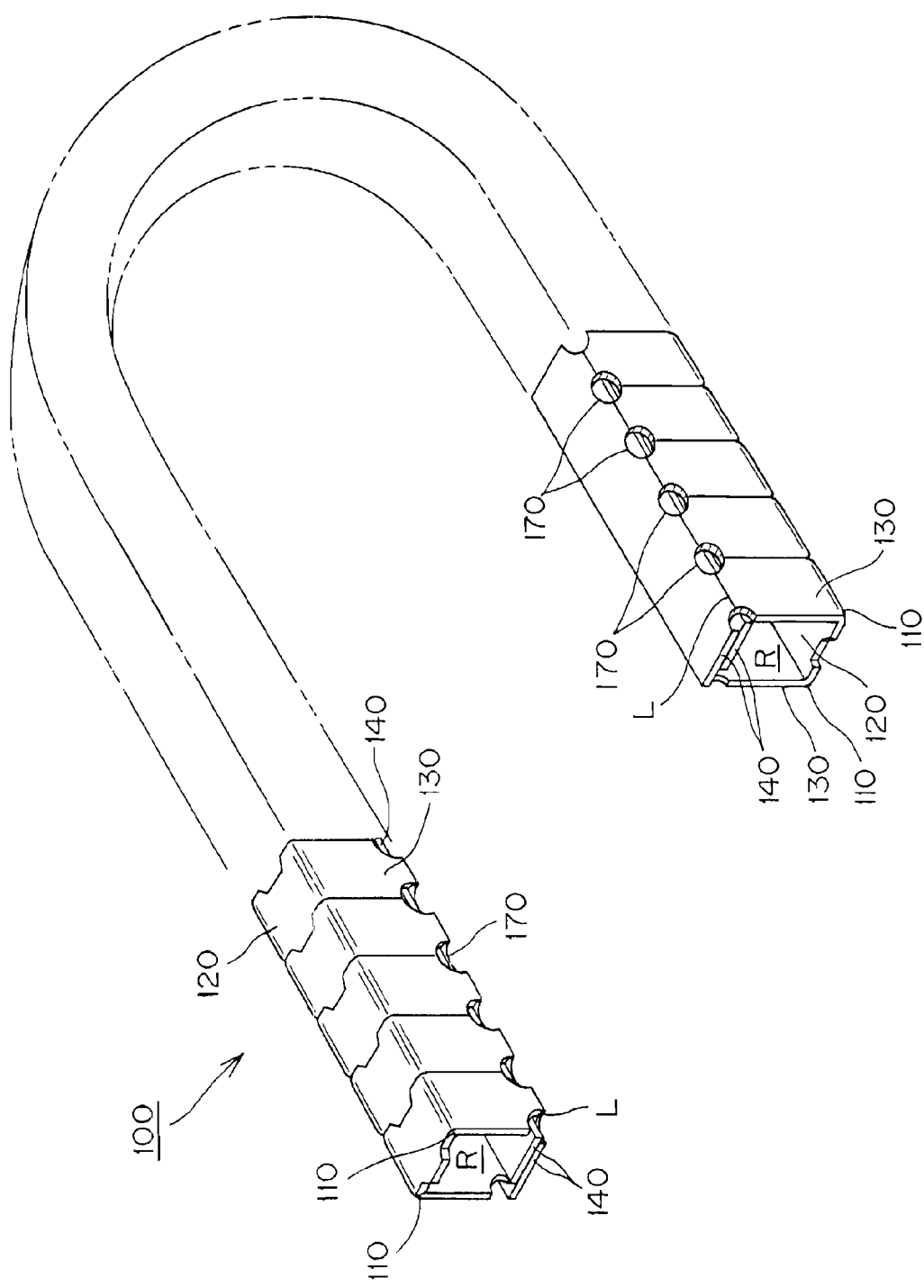

FIG. 1 is an entire view of a folding type cable protection and guide device, which is an example according to the present invention.

Figure 2:
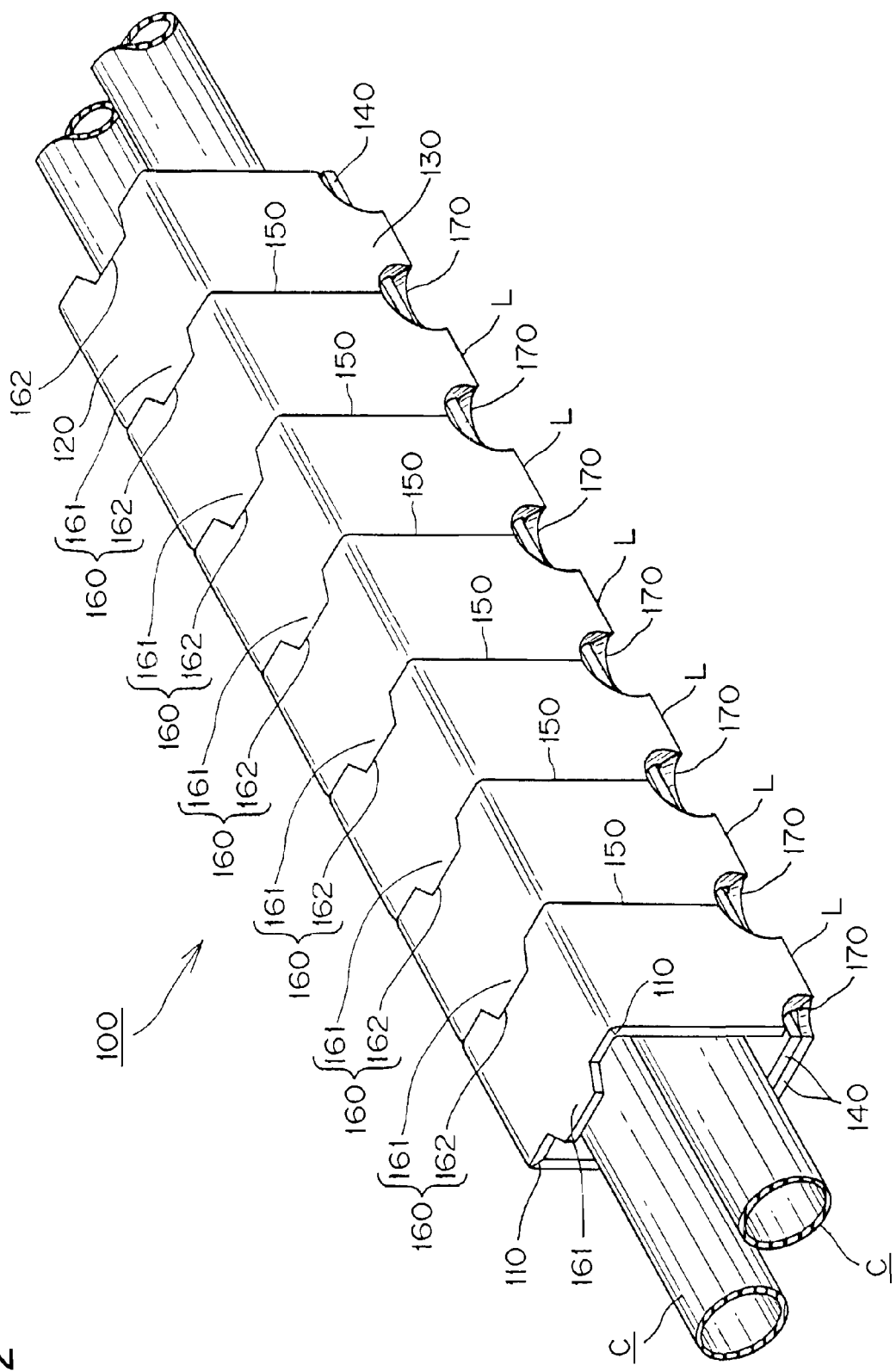

FIG. 2 is a perspective view of an enlarged linear state of FIG. 1.

Figure 3:
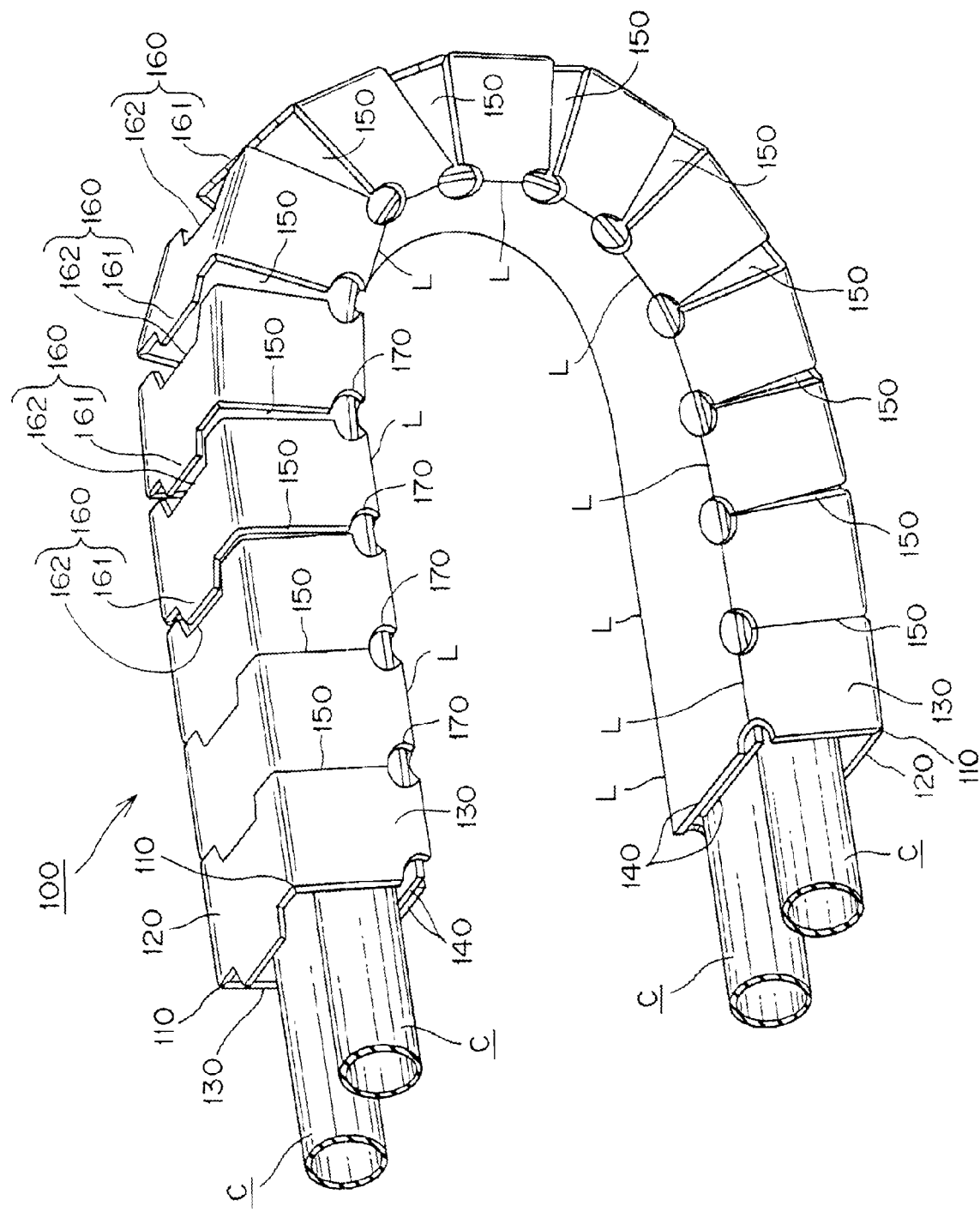

FIG. 3 is a perspective view of an enlarged flexed state of FIG. 1.

Figure 4:
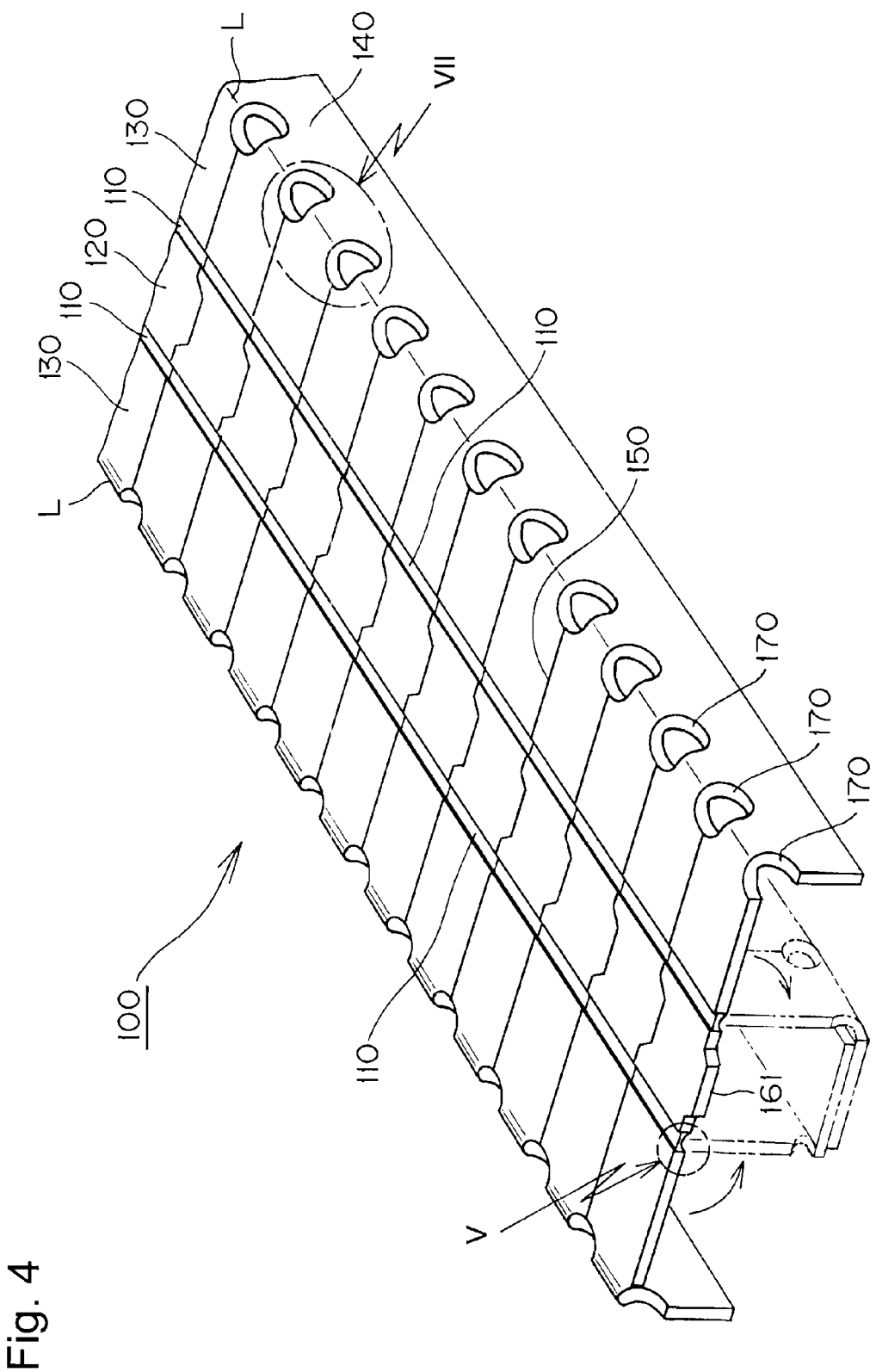

FIG. 4 is a development view of a synthetic resin tape used of FIG. 1.

Figure 5:
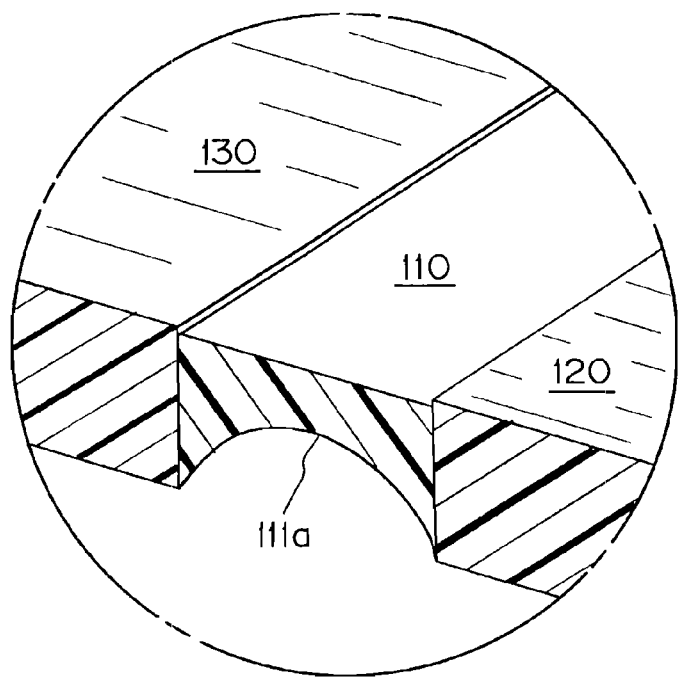

FIG. 5 is an enlarged view showing the V section of FIG. 4.

Figure 6:
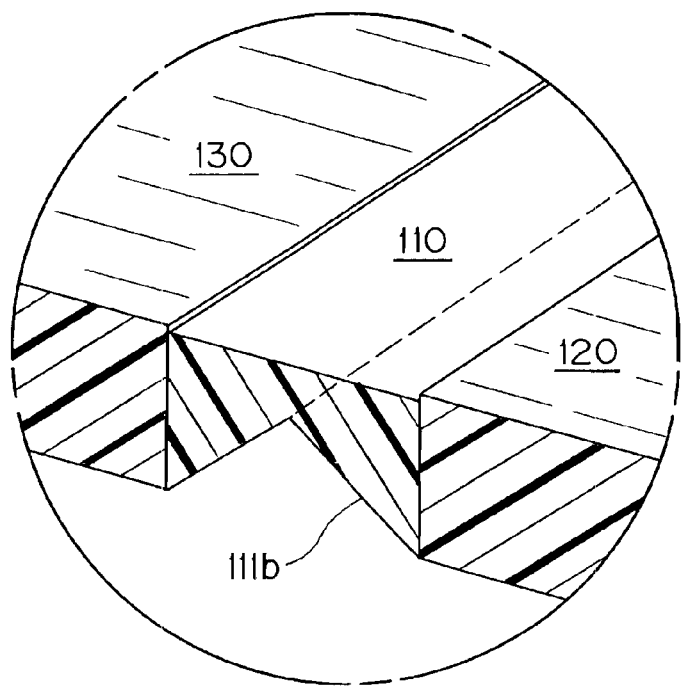

FIG. 6 is an enlarged view showing a modified example of the embodiment shown in FIG. 5.

Figure 7:
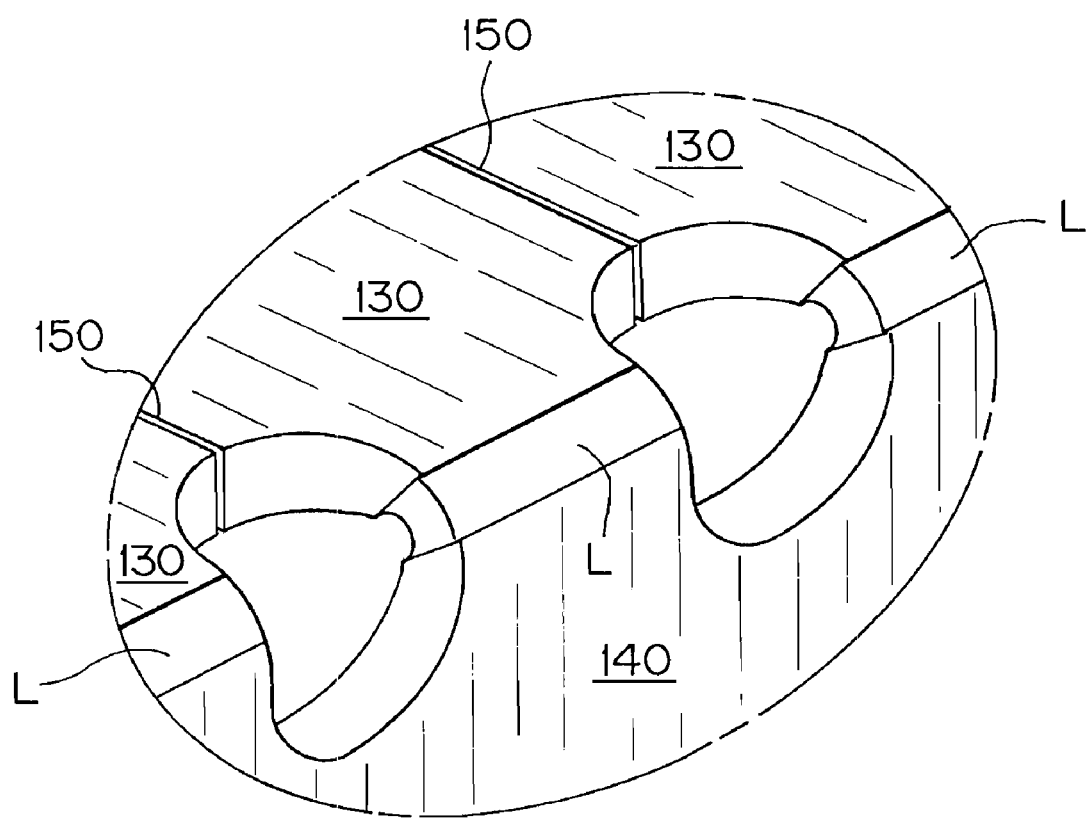

FIG. 7 is an enlarged view showing the VII section of FIG. 4.

DESCRIPTION OF THE INVENTION

A folding type cable protection and guide device, which is an example according to the present invention, will be described with reference to FIGS. 1 and 7 below.

Here, FIG. 1 is an entire view showing a folding type cable protection and guide device. FIG. 2 is a perspective view of an enlarged linear state of FIG. 1. FIG. 3 is a perspective view of an enlarged flexed state of FIG. 1. FIG. 4 is a development view of a synthetic resin tape used in FIG. 1. FIG. 5 is an enlarged view showing the V section of FIG. 4. FIG. 6 is an enlarged view showing a modified example of the embodiment shown in FIG. 5. FIG. 7 is an enlarged view showing the VII section of FIG. 4.

The folding assembly type cable protection and guide device of the present example is used for connecting a movable section and a stationary section of a device and supplying the device with energy such as electric power or compressed air. Examples may include: a semiconductor device, a pharmacy developing testing device, a vehicle door opening/closing device, a vehicle slide seat, or a vehicle motor sunroof. The folding assembly type cable protection and guide device safely and reliably guides and protects a cable (cables) C such as an electric cable, which transmits and supplies electric signals and a hose, which supplies pressure liquid or pressure gas.

The device can exhibit a linear position or a flexing position. As shown in FIGS. 1 to 3, the folding type cable protection and guide device including a synthetic resin film tape 100 formed in such a manner that a cable C is accommodated into a rectangularly shaped cable accommodating space R through a pair of right and left folding sections 110. The folding sections 110 are extended by extrusion molding along the longitudinal direction of the tape. Both linear movement and flexing movement can repeated throughout the device for extended periods of time.

Namely, the above-mentioned synthetic resin tape 100 includes an outer circumferential wall formation section 120, a pair of right and left side wall formation sections 130, 130, and a pair of right and left inner circumferential wall formation sections 140, 140. The outer circumferential wall formation sections 120 adjacently engage with each other in a longitudinal direction of the tape during linear movement and separate from each other to open at predetermined pitches in the longitudinal direction of the tape during flexional movement. The outer circumferential wall formation section 120 has a pair of right and left folding sections 110, 110 located on both the sides. A pair of right and left side wall formation sections 130, 130, are located adjacent to the pair of right and left folding sections 110, 110. Further, the pair of right and left side wall formation sections 130, 130 are adjacently engaged with each other in the longitudinal direction of the tape during linear movement and separate from each other to open at predetermined pitches in the longitudinal direction of the tape during flexional movement.

Finally, the pair of right and left inner circumferential wall formation sections 140, 140, are respectively disposed to the pair of right and left side wall formation sections 130, 130 in a vertical L-shape. The circumferential wall formation sections 140, 140, are perpendicular to the pair of right and left side wall formation sections 130, 130 Additionally, the pair of right and left inner circumferential wall formation sections 140, 140, when folded form one side of the the cable accommodating space R. The pair of right and left inner circumferential wall formation sections 140, 140 are located opposite the outer circumferential wall formation section 120. The pair of right and left inner circumferential wall formation sections 140, 140, overlap each other along the longitudinal direction of the tape in the assembled folding type cable protection and guide device.

The above-mentioned folding section 110 includes an opening groove such as an arc-shaped groove 111a to suppress folding distortion on the inside of the cable accomodating space. The opening groove is folded in the longitudinal direction of the tape as shown in FIG. 5. The opening groove reduces resilience during folding. A V-shaped groove 111b shown in FIG. 6 may also be used in place of the arc-shaped groove. The folding sections are more easily folded and a rectangularly shaped cable accommodating space R can be reliably formed with this opening groove structure in the folding section.

The above-mentioned outer circumferential wall formation sections 120, the side wall formation sections 130, and the inner circumferential wall formation sections 140 are molded of polypropylene and are easily processed by extrusion or punching (which will be described later in detail). These sections provide rigidity to the folding section 110, so that, the dimensional stability of the cable accommodating space R is sufficiently ensured.

Further, the folding section 110 is molded of polyester or thermoplastic olefin elastomer. The folding section 110 exhibits greater flexibility than the outer circumferential wall formation sections 120, the side wall formation sections 130, and the inner circumferential wall formation sections 140. As a result, there is less resilience at the time of folding.

Further, as shown in FIGS. 5, 6, and 7, a joint region is disposed in a fixed vertical L-shaped state between the above-mentioned outer circumferential wall formation section 120 and the side wall formation section 130. This joint region is molded of polyester or thermoplastic olefin similar to the above-mentioned folding section 110. This joint region may be molded at the same time with the outer circumferential wall formation section 120, the side wall formation section 130, and the inner circumferential wall formation section 140 which maybe made of different materials. Deformation can occur without generating excessive distortion in the joining region between the outer circumferential wall formation section 120 and the side wall formation section 130 during flexional movement. This allows smooth flexional operation to be maintained.

Therefore, multi-color extrusion may be used to form the device of different sections comprising different materials. For example, the outer circumferential wall formation section 120 and the side wall formation section 130 can be formed of one material such as polypropylene, the inner circumferential wall formation section 140 of can be formed of another material such as a more flexible polypropylene (more flexible than the outer circumferential wall formation section 120 and the side wall formation section 130), and the folding section 110 of still another material such as polyester or thermoplastic olefin elastomer.

Further, the cable accommodating space R is able to accommodate cables of a variety of lengths. Even if the cable is a long body, the synthetic resin tape 100 may be cut as a continuing integrated body in accordance with the length of the long body. As a result, the cable accomodating space is sufficiently adaptable.

Further, a splitting slit 150 separates the outer circumferential wall formation sections 120 and the pair of right and left side wall formation sections 130, 130 from each other at a predetermined pitch in a longitudinal direction of the tape during flexional movement. The splitting slit 150 is formed by punching into the extruded resin synthetic tape. The splitting slit 150 crosses the folding section 110 at a predetermined pitch and at the same time splits the folding section while leaving the pair of right and left inner circumferential wall formation sections 140, 140 intact.

A punching interval that forms the above-mentioned splitting slit 150 in the synthetic resin tape 100 can be appropriately selected. A flexing pitch can be easily changed to variety of different intervals for forming the cable accommodating space R.

Further, a concave portion/convex portion engagement mechanism 160 is provided at adjacent positions of the above-mentioned outer circumferential wall formation sections 120 on opposite the sides of the splitting slit 150. The concave portion/convex portion engagement mechanism 160 comprises a trapezoid tongue piece-shaped convex portion 161 and an inverse trapezoid-shaped concave portion 162, which engages with the trapezoid tongue piece-shaped convex portion 161. The concave portion/convex portion engagement mechanism 160 restricts lateral shifts of the adjacent outer circumferential wall formation sections 120 within the splitting slit 150 during linear movement. Smooth linear movement of the device is maintained and snaking movement is avoided.

Further, a circular open window 170 is located at a cross position of side wall formation section 130 and the inner circumferential wall formation section 140 and the splitting slit 150. The circular open window 170 is provided for folding the above-mentioned folding section 110. The circular open window 170 is formed by punching and penetrates into the cable accommodating space R.

This circular open window 170 absorbs the distortion of the cable accommodating space R likely to occur by an internal movement of the cable C during both linear movement and during flexional movement. Excellent shape retention is ensured. Further, this construction contributes to weight reduction and allows viewing of the cable in the cable accommodating space R through the circular open window 170.

In the folding type cable protection and guide device of the first example a cable C is accommodated into the cable accommodating space R. In the case that cable C is long body, the cable accomodating space is cut as a continuing integrated body in accordance with the length of the cable. A cable accommodating space R is adapted to the length of the cable. Optimum length of the cable accomodating space R is easily ensured. Further, assembly is simplified. Connecting a number of individual link plates as in a conventional protection and guide chain to provide a specific length is not necessary. Further, even synthetic resin film tape 100 of increased length can be easily manufactured. As a result, various sizes of metal molds in injection molding or casting in accordance with the length of a cable C are not required.

The synthetic resin tape 100 can be easily folded through a folding section 110. The pair of right and left inner circumferential wall formation sections 140, 140 and the side wall formation sections 130, 130 have already been disposed in a fixed vertical L-shape at the time of extrusion. A rectangularly shaped cable accommodating space R can be uniformly and reliably assembled to a predetermined size along the longitudinal direction of the tape. Further, a synthetic resin tape can be easily assembled by enclosing the cable with a connector on both sides along the longitudinal direction of the tape. As a result, a cable with a connector does not have to be inserted through a hollow integrated type cable protection and guide device which has an opening/closing arm as in a conventional case. Instead, the cable with a connector on both sides may be enclosed in a synthetic resin tape along the longitudinal direction of the tape.

Further, in the folding type cable protection and guide device of this example, since the outer circumferential wall formation section 120, the side wall formation section 130, and the inner circumferential wall formation section 140 are molded of polypropylene, the extrusion and punching are easily carried out. The sections of this device molded of polypropylene are rigid relative to the folded sections enabling the form of the cable accomodating space to be maintained more easily.

The folded section is molded of polyester or thermoplastic olefin elastomer. The folding section 110 exhibits greater flexibility relative to the outer circumferential wall formation section 120, the side wall formation section 130, and the inner circumferential section 140, so that resilience generated at the time of folding is reduced. Thus, the folding load also can be reduced. Therefore, the benefits are very significant.

DESCRIPTION OF REFERENCE NUMERALS

100 . . . Synthetic resin tape
110 . . . Folding section
111a . . . Arc-shaped groove
111b . . . V-shaped groove
120 . . . Outer circumferential wall formation section
130 . . . Side wall formation section
140 . . . Inner circumferential wall formation section
150 . . . Split slit
160 . . . Concave portion/convex portion engagement mechanism
161 . . . Trapezoid tongue piece-shaped convex portion
162 . . . Inverse trapezoid-shaped concave portion
170 . . . Open window
C . . . Cable or the like
R . . . Cable accommodating space
L . . . L-shaped vertically provided state Those skilled in the art will readily recognize that the invention has been set forth by way of example only and that many changes may be made to the invention without departing from the spirit and the scope of the invention as set forth in the claims below.

The invention claimed is:

1. A folding type cable protection and guide device, comprising:
a synthetic resin tape;
said synthetic resin tape includes an outer circumferential wall formation section;
said synthetic resin tape includes a pair of right and left side wall formation sections;
said synthetic resin tape includes a pair of right and left inner circumferential wall formation sections;
said synthetic resin tape includes a pair of right and left folding sections extending in a longitudinal direction of said synthetic resin tape;
said outer circumferential wall formation section, said pair of right and left side wall formation sections, said pair of right and left inner circumferential wall formation sections and said pair of right and left folding sections forming a rectangularly shaped cable accommodating space;
said pair of right and left inner circumferential wall formation sections are integral with said pair of right and left side wall formation sections and are disposed opposite of said outer circumferential wall formation section about said cable accommodating space;
said pair of right and left inner circumferential wall formation sections are overlapped along said longitudinal direction of said tape;
said right side wail formation section is connected to said right folding section;
said left side wall formation section is connected to said left folding section;
said outer circumferential wall formation section interconnected to said pair of folding sections;
open circular windows residing partially in said pair of right and left inner circumferential sections and said open circular windows residing partially in said pair of right and left side wall formation sections;
a plurality of splitting slits;
each of said splitting slits extends from one of said open circular windows through said right side wall formation section, through said right folding section, through said outer circumferential wall formation section, through said left folding section, through said left side wall formation section and extending to another of said open circular windows of said synthetic resin tape;
each of said splitting slits includes a concave portion/convex portion engagement mechanism in said outer circumferential wall formation section of said synthetic resin tape;
each said convex portion of said concave portion/convex portion engagement mechanism interengages a concave portion of another adjacent concave portion/convex portion mechanism formed by another splitting/slit restricting lateral shifting of said folding cable protection and guide device during linear movement of said folding cable protection and guide device;
each of said splitting slits in said right and left side wall formation sections divides said right and left side wall formation sections into portions;
each of said convex portions of each of said concave portion/convex portion engagement mechanisms includes a trapezoidally-shaped tongue and each of said concave portions of each of said concave portion/convex portion engagement mechanisms includes an inverse trapezoidally shaped concave tongue engaging portion;
said trapezoidally-shaped tongue of said convex portion of each said concave portion/convex portion engagement mechanism interengages said inverse trapezoidally shaped concave tongue engaging portion of said concave portion of said another adjacent concave portion/concave portion formed by said another splitting slit during linear movement of said folding type cable protection and guide device restricting lateral shifting of said folding cable protection and guide device;
said trapezoidally-shaped tongue of said convex portion of each said concave portion/convex portion engagement mechanism separates from said inverse trapezoidally shaped concave tongue engaging portion of said concave portion of said another adjacent concave portion/concave portion formed by said another splitting slit to open at predetermined pitches in said longitudinal direction of said tape during flexional movement of said folding type cable protection and guide device;
each of said splitting slits open and separate said portions of said pair of right and left side wall formation sections at a determined pitch in a longitudinal direction of synthetic resin tape during flexional movement of said folding type cable protection and guide device; and,
each of said splitting slits close and do not separate said portions of said pair of right and left side wall formation sections in said longitudinal direction of said tape during linear movement of said folding type cable protection and guide device.

2. A folding type cable protection and guide device according to claim 1, wherein said folding sections include an arc-shaped groove and said arc-shaped groove opens along a longitudinal direction of said tape.

3. A folding type cable protection and guide device according to claim 2, wherein: said outer circumferential wall formation section, said side wall formation sections and said inner circumferential wall formation sections are molded of polypropylene; and, said folded sections are molded of polyester or thermoplastic olefin elastomer.

4. A folding type cable protection and guide device according to claim 1, wherein said folding sections include a V-shaped groove and said V-shaped groove opens along a longitudinal direction of said tape.

5. A folding type cable protection and guide device according to claim 4, wherein: said outer circumferential wall formation section, said side wall formation sections and said inner circumferential wall formation sections are molded of polypropylene; and, said folded sections are molded of polyester or thermoplastic olefin elastomer.

6. A folding type cable protection and guide device according to claim 1, wherein: said outer circumferential wall formation section, said side wall formation sections, and said inner circumferential wall formation sections are molded of polypropylene; and, said folded sections are molded of polyester or thermoplastic olefin elastomer.

7. A folding type cable protection and guide device according to claim 1, wherein said folding sections include a groove; and, said groove opens along a longitudinal direction of said tape.

* * * * *

UNITED STATES PATENT AND TRADEMARK OFFICE
CERTIFICATE OF CORRECTION

PATENT NO. : 7,942,169 B2
APPLICATION NO. : 11/781113
DATED : May 17, 2011
INVENTOR(S) : Komiya et al.

Page 1 of 1

It is certified that error appears in the above-identified patent and that said Letters Patent is hereby corrected as shown below:

On the title page of the patent after "(74) Attorney, Agent, or Firm-" delete "Woodland" and insert --Woodling--.

Claim 1, col. 10, line 4, after "said right side" delete "wail" and insert --wall--.

Claim 1, col. 10, line 30, after "mechanism formed by another splitting" delete "/".

Claim 1, col. 10, line 63, after "at a" delete "determined" and insert --predetermined--.

Signed and Sealed this
Thirteenth Day of September, 2011

David J. Kappos
*Director of the United States Patent and Trademark Office*